US008326478B2

(12) United States Patent
Ichikawa

(10) Patent No.: US 8,326,478 B2
(45) Date of Patent: Dec. 4, 2012

(54) HYBRID VEHICLE AND METHOD OF CONTROLLING THE SAME

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 279 days.

(21) Appl. No.: 12/933,535

(22) PCT Filed: Feb. 12, 2009

(86) PCT No.: PCT/JP2009/052293
§ 371 (c)(1),
(2), (4) Date: Sep. 20, 2010

(87) PCT Pub. No.: WO2009/122777
PCT Pub. Date: Oct. 8, 2009

(65) Prior Publication Data
US 2011/0022260 A1 Jan. 27, 2011

(30) Foreign Application Priority Data
Mar. 31, 2008 (JP) ................. 2008-091953

(51) Int. Cl.
B60L 9/00 (2006.01)
(52) U.S. Cl. .......... 701/22; 701/409; 701/410; 701/423; 340/995.19; 340/995.21; 903/903; 903/907; 903/918; 180/65.245; 180/65.27
(58) Field of Classification Search .................. 701/22, 701/423, 409, 410; 180/65.3, 65.27, 65.245; 340/995.19, 995.21; 903/907, 903, 918
See application file for complete search history.

(56) References Cited

U.S. PATENT DOCUMENTS

| 5,815,824 | A * | 9/1998 | Saga et al. ...................... 701/22 |
| 7,251,560 | B2* | 7/2007 | Ogasawara et al. ........... 701/423 |
| 2003/0015358 | A1* | 1/2003 | Abe et al. ..................... 180/65.3 |
| 2003/0078707 | A1 | 4/2003 | Shioda et al. |
| 2004/0024523 | A1* | 2/2004 | Uotani ........................ 701/210 |
| 2007/0073455 | A1 | 3/2007 | Oyobe et al. |

FOREIGN PATENT DOCUMENTS

| EP | 1 297 982 A1 | 4/2003 |
| EP | 1 842 757 A1 | 10/2007 |
| JP | A-7-107617 | 4/1995 |

(Continued)

OTHER PUBLICATIONS

International Search Report dated May 19, 2009 in corresponding International Application No. PCT/JP2009/052293 (with translation).

(Continued)

Primary Examiner — Redhwan k Mawari
(74) Attorney, Agent, or Firm — Oliff & Berridge, PLC

(57) ABSTRACT

When passage through a road pricing area where an exhaust gas emission vehicle is subjected to billing is predicted, an ECU calculates a stored energy quantity available for EV traveling based on the current SOC of a power storage device, and estimates a required energy quantity for passing through the road pricing area by EV traveling. The ECU further calculates a deficit of the stored energy quantity relative to the required energy, and if a deficit is found, executes vehicle control for preparing a vehicle condition for passage through the road pricing area corresponding to the energy deficit.

12 Claims, 5 Drawing Sheets

FOREIGN PATENT DOCUMENTS

| | | |
|---|---|---|
| JP | A-8-240435 | 9/1996 |
| JP | A-10-170293 | 6/1998 |
| JP | A-2002-163756 | 6/2002 |
| JP | A-2003-85604 | 3/2003 |
| JP | A-2003-111208 | 4/2003 |
| JP | A-2003-294463 | 10/2003 |
| JP | A-2003-323648 | 11/2003 |
| JP | A-2005-274213 | 10/2005 |
| JP | A-2007-94867 | 4/2007 |

OTHER PUBLICATIONS

European Search Report dated Mar. 15, 2011 in corresponding European Application No. 09728630.6.

* cited by examiner

HYBRID VEHICLE AND METHOD OF CONTROLLING THE SAME

TECHNICAL FIELD

The present invention relates to a hybrid vehicle and a method of controlling the same, and more particularly to control when a hybrid vehicle that allows for selection of a traveling mode with an engine stopped approaches an area regulated by road pricing.

BACKGROUND ART

Road pricing has been proposed that bills vehicles traveling in a certain target region in order to relieve traffic congestion and reduce air pollution. For example, Japanese Patent Laying-Open No. 2005-274213 (Patent Document 1) describes a navigation system that executes route setting in consideration of an area regulated by road pricing (hereinafter referred to as a road pricing area).

Particularly, in the navigation system of Patent Document 1, in route setting, if an area used for route calculation includes a road pricing area, a determination is made whether entrance into the road pricing area is permitted or not based on permission information (a road pricing area under entrance permission and its permission period), and then a route is set which avoids a road pricing area having been determined that entrance thereto is not permitted. Accordingly, route calculation can be automatically executed avoiding such a situation that a vehicle will be billed for passage through the road pricing area with an area license invalidated.

Japanese Patent Laying-Open No. 7-107617 (Patent Document 2) describes a hybrid vehicle that when traveling along a determined traveling route, allows for traveling in a traveling mode in accordance with a traveling environment, specifically, a motor mode of traveling with a motor alone using a battery as a power source without using the driving force of an engine.

Particularly, the hybrid vehicle described in Patent Document 2, when a driver selects a partial-area zero emission mode in accordance with driver's mode selection, travels in a densely populated area or a gas regulated area with the motor mode applied. When the driver selects a total zero emission mode, a total traveling distance is calculated from a traveling route retrieved as a result of route searching, and a determination is made whether or not the vehicle can travel the total traveling distance in the motor mode depending on the current battery state of charge, so that the necessity for charging is determined. Further, it is described that, when charging is necessary, a determination is made whether or not there is a charging station on the traveling route, and when there is a charging station, the driver receives an inquiry by an audio output or a display about whether or not he/she intends to charge the battery.

Furthermore, Japanese Patent Laying-Open No. 10-170293 (Patent Document 3) describes a route searching device for an electric vehicle for searching for an optimum leading route to a destination in consideration of the charge of the electric vehicle. Particularly, the configuration described in Patent Document 3 searches for a leading route to a destination in consideration of the charge of an on-vehicle battery, based on road map data containing information on charging stations.

Japanese Patent Laying-Open No. 2002-163756 (Patent Document 4) discloses an exclusive road entry and exit control system for an automatic travel vehicle capable of determining whether or not a vehicle is an AHS (Advanced Cruise-Assist Highway Systems) vehicle having specific advanced equipment, permitting only such an AHS vehicle to enter an exclusive road, and executing vehicle ID registration for entry into and exit from the exclusive road.

Patent Document 1: Japanese Patent Laying-Open No. 2005-274213
Patent Document 2: Japanese Patent Laying-Open No. 7-107617
Patent Document 3: Japanese Patent Laying-Open No. 10-170293
Patent Document 4; Japanese Patent Laying-Open No. 2002-163756

DISCLOSURE OF THE INVENTION

Problems to be Solved by the Invention

As a mode of road pricing, particularly when considering the influence upon air pollution, a regulation is assumed by which an exhaust gas emission vehicle is subjected to billing, that is, a so-called zero emission vehicle is not subjected to billing. In the case of such a regulation, not only an electric vehicle using electric power alone as motive power, but also a hybrid vehicle capable of traveling using a motor output alone with an internal combustion engine stopped (hereinafter also referred to as EV traveling) is allowed to pass through a road pricing area without being billed provided that the EV traveling is performed.

However, when the hybrid vehicle, also capable of traveling using the internal combustion engine alone or using both of outputs from the internal combustion engine and the motor, enters a road pricing area with EV traveling being impossible, or when electric power of the power storage device is exhausted during passage through the road pricing area so that the EV traveling becomes impossible, the vehicle may be billed in some cases contrary to a user's intention.

A hybrid vehicle has been proposed recently which is configured such that an on-vehicle power storage device storing electric power for driving the motor can be charged by a charging facility, such as a charging station, external to the vehicle. The distance that such a hybrid vehicle can travel by EV traveling can be extended by utilizing the charging station or the like.

Therefore, when passing through the above-mentioned road pricing area, a vehicle condition is preferably prepared in advance to allow for passage through the road pricing area by EV traveling. However, Patent Documents 1 to 4 all fail to take such a road pricing area into consideration and to describe control therefor.

The present invention was made to solve the above-described problems, and an object of the present invention is to provide a hybrid vehicle, which includes an internal combustion engine and a motor that outputs a vehicle driving force using electric power from a power storage device, with suitable vehicle preparation for passage through a road pricing area where an exhaust gas emission vehicle is subjected to billing.

Means for Solving the Problems

A hybrid vehicle according to the present invention includes an internal combustion engine, a power storage device configured to be rechargeable by a charging facility external to the hybrid vehicle, a motor outputting a vehicle driving force using electric power from the power storage device, a vehicle position sensing unit, an information acquisition unit, a passage prediction unit, an acquisition unit, a required energy estimation unit, an energy deficit calculation unit, and a control unit. The vehicle position sensing unit acquires vehicle position information of the hybrid vehicle. The information acquisition unit acquires at least one of road map information and external information from outside the hybrid vehicle. The passage prediction unit is configured to predict in advance whether the hybrid vehicle will pass through a certain regulated area where vehicle traveling using the internal combustion engine is subjected to billing, based on the vehicle position information as well as on the at least one of the road map information and the external information. The acquisition unit acquires a current state of charge of the power storage device when passage through the regulated area is predicted. The required energy estimation unit estimates a required energy quantity required to be output from the power storage device for passing through the regulated area in an electric traveling mode of traveling using the vehicle driving force from the motor with the internal combustion engine stopped, when passage through the regulated area is predicted. The energy deficit calculation unit calculates an energy deficit of the power storage device deficient for the hybrid vehicle to pass through the regulated area in the electric traveling mode, based on an estimated value of the required energy quantity estimated by the required energy estimation unit and the current state of charge of the power storage device. The control unit is configured to execute control for preparing for passage through the regulated area based on the energy deficit calculated by the energy deficit calculation unit, before entering the regulated area.

In a method of controlling a hybrid vehicle according to the present invention, the hybrid vehicle is equipped with an internal combustion engine, a power storage device configured to be rechargeable by a charging facility external to the hybrid vehicle, a motor outputting a vehicle driving force using electric power from the power storage device, and a navigation system configured to acquire vehicle position information of the hybrid vehicle and at least one of road map information and external information from outside the hybrid vehicle. The method of controlling includes the steps of predicting in advance whether the hybrid vehicle will pass through a certain regulated area where vehicle traveling using the internal combustion engine is subjected to billing, based on the vehicle position information as well as on the at least one of the road map information and the external information, acquiring a current state of charge of the power storage device when passage through the regulated area is predicted, estimating a required energy quantity required to be output from the power storage device for passing through the regulated area in an electric traveling mode of traveling using the vehicle driving force from the motor with the internal combustion engine stopped, when passage through the regulated area is predicted, calculating an energy deficit of the power storage device deficient for the hybrid vehicle to pass through the regulated area in the electric traveling mode, based on an estimated value of the required energy quantity estimated by the step of estimating and the current state of charge of the power storage device, and executing control for preparing for passage through the regulated area based on the energy deficit calculated by the step of calculating, before entering the regulated area.

According to the above-described hybrid vehicle and the method of controlling the hybrid vehicle, when the hybrid vehicle approaches a certain regulated area (road pricing area) where vehicle traveling using the engine is subjected to billing, an energy deficit for passing through the road pricing area without being billed by the electric traveling mode (EV traveling) can be estimated based on the current state of charge of the on-vehicle power storage device. If such an energy deficit is found, preparation of a vehicle condition (the state of charge of the power storage device) for passage through the road pricing area can be executed suitably corresponding to the energy deficit.

Preferably, the control unit includes an external charge control unit controlling charging in accordance with a state of charge and a charge target level of the power storage device during external charge of the power storage device by the charging facility. When the energy deficit is calculated by the energy deficit calculation unit, the external charge control unit sets the charge target level such that an energy quantity charged by the external charge corresponds to the energy deficit. The method of controlling further includes the step of setting a charge target level during external charge of the power storage device by the charging facility such that an energy quantity charged by the external charge corresponds to the energy deficit, when the energy deficit is calculated by the step of calculating.

As described above, when the power storage device is externally charged by the charging facility external to the vehicle before passing through the road pricing area, the charge target level is set at a minimum level for compensating for the estimated energy deficit, not at a full charge level like under usual conditions. A vehicle condition (the state of charge of the power storage device) for passage through the road pricing area can thus be prepared efficiently.

More preferably, the control unit includes a guiding unit for requesting a user of the hybrid vehicle to have the power storage device charged, when the energy deficit is calculated by the energy deficit calculation unit. The step of executing control offers guidance for requesting the user of the hybrid vehicle to have the power storage device charged, when the energy deficit is calculated by the energy deficit calculation unit.

Still more preferably, the guiding unit is further configured to inform the user of a required time for charging the energy deficit by the charging facility adjacent to the current position of the hybrid vehicle, based on the at least one of the road map information and the external information as well as on the energy deficit. The step of executing control informs the user of a required time for charging the energy deficit by the charging facility adjacent to the current position of the hybrid vehicle, based on the at least one of the road map information and the external information as well as on the energy deficit.

As described above, requesting the vehicle user to execute external charge based on the energy deficit enables suitable preparation of a vehicle condition (the state of charge of the power storage device) for passage through the road pricing area. Particularly, informing a required time for charging the energy deficit at an adjacent charging facility (charging station) can improve user convenience in determining whether to bypass the road pricing area.

EFFECTS OF THE INVENTION

According to the present invention, a hybrid vehicle including a motor that outputs a vehicle driving force using electric power from a power storage device can be provided with suitable vehicle preparation for passage through a road pricing area where an exhaust gas emission vehicle is subjected to billing.

Figure 1:
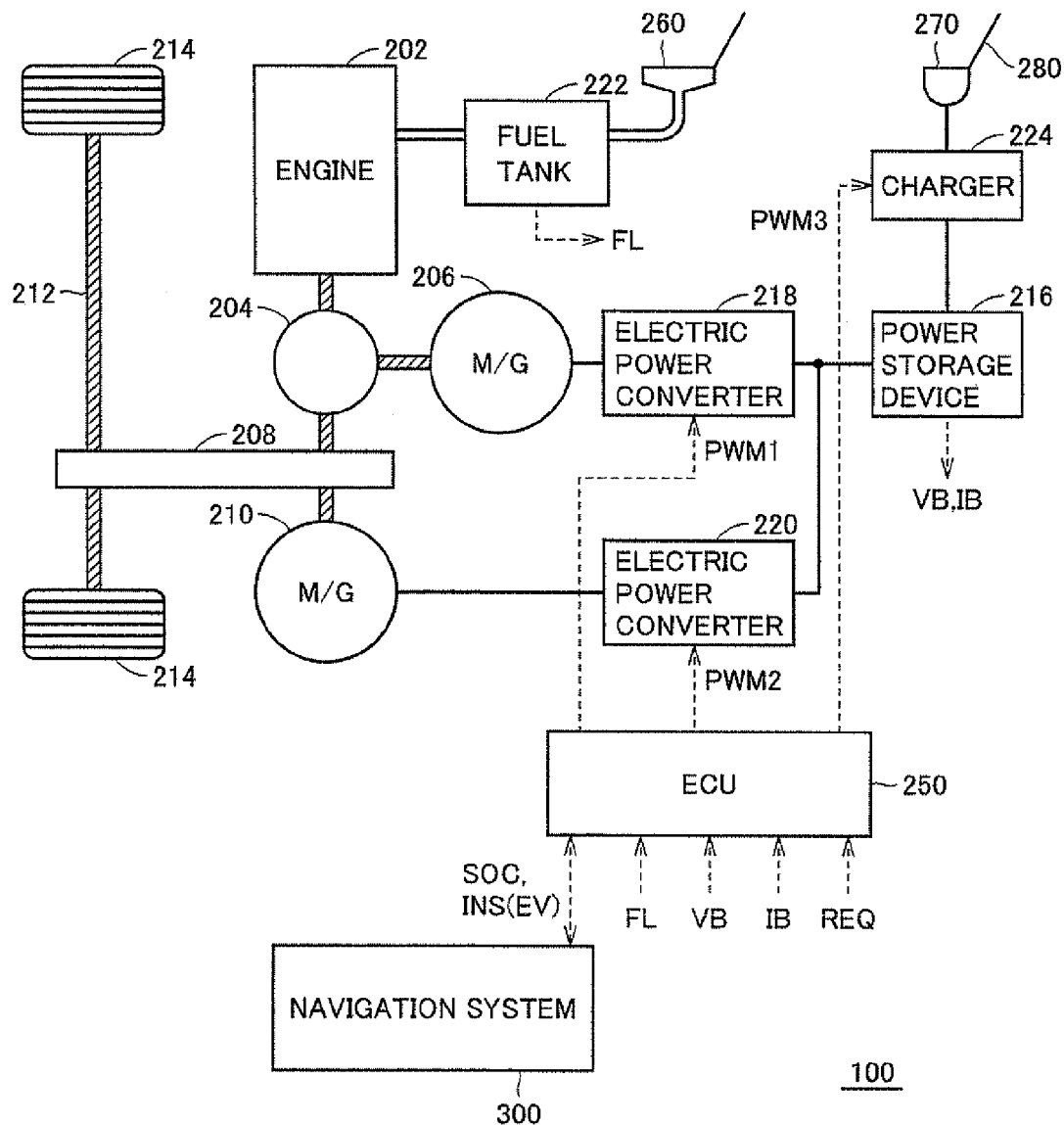
FIG. 1 is a functional block diagram illustrating a configuration example of a hybrid vehicle according to an embodiment of the present invention.

DESCRIPTION OF THE REFERENCE SIGNS 100 hybrid vehicle; 142 accelerator position sensor; 144 vehicular speed sensor; 202 engine; 204 power split mechanism; 206, 210 motor generators; 208 transmission gear; 212 driving shaft; 214 wheel; 216 power storage device; 218, 220 electric power converters; 222 fuel tank; 224 charger (external charge); 250 ECU; 252 hybrid control unit; 254 battery control unit; 256 engine control unit; 260 fuel supply port; 270 charging connector; 280 feeder cable; 300 navigation system; 310 navigation controller; 320 antenna; 330 beacon receiving unit; 340 gyro sensor; 350 display unit; 355 recording medium; 360 interface unit; 370 storage portion; 400 passage/nonpassage prediction unit; 410 SOC acquisition unit; 420 required energy estimation unit; 430 energy deficit calculation unit; 440 charge request guiding unit; 500 external charge control unit; FLR approach flag; FNEV flag; PWM1, PWM2, PWM3 signals; SOC state of charge (power storage device); V vehicular speed; Wev required energy quantity (passage by EV traveling); Wst stored energy quantity; ΔW energy deficit (Wst−Wev)

BEST MODES FOR CARRYING OUT THE INVENTION

Embodiments of the present invention will be described in detail below with reference to the drawings. In the following description, the same or corresponding parts are given the same reference numerals, and a detailed description thereof will not be repeated in principle.

FIG. 1 is a functional block diagram illustrating a configuration example of a hybrid vehicle according to an embodiment of the present invention.

Referring to FIG. 1, a hybrid vehicle 100 includes an engine 202, a power split mechanism 204, motor generators 206, 210, a transmission gear 208, a driving shaft 212, and wheels 214. Moreover, hybrid vehicle 100 includes power storage device 216, electric power converters 218, 220, a fuel tank 222, a charger 224, an ECU (Electronic Control Unit) 250, a fuel supply port 260, a charging connector 270, and a navigation system 300.

Power split mechanism 204 is coupled to engine 202, motor generator 206, and transmission gear 208 to split power among them. For example, a planetary gear having three rotary shafts of a sun gear, a planetary carrier, and a ring gear can be used as power split mechanism 204, and these three rotary shafts are connected to rotary shafts of engine 202, motor generator 206, and transmission gear 208, respectively.

Kinetic energy created by engine 202 is distributed between motor generator 206 and transmission gear 208 by power split mechanism 204. That is, engine 202 is incorporated in hybrid vehicle 100 as a power source that drives transmission gear 208 transmitting the power to driving shaft 212, and also drives motor generator 206. Motor generator 206 is incorporated in hybrid vehicle 100 as a component that operates as a generator driven by engine 202, and that operates as a motor capable of starting engine 202. Moreover, motor generator 210 is incorporated in hybrid vehicle 100 as a power source that drives transmission gear 208 transmitting the power to driving shaft 212.

Power storage device 216 is a rechargeable DC power source, and is made of a secondary battery of nickel hydrogen, lithium ion or the like, for example. Power storage device 216 supplies electric power to electric power converters 218 and 220. Moreover, power storage device 216, at the time of power generation of motor generator(s) 206 and/or 210, receives electric power from electric power converter(s) 218 and/or 220 to be charged.

Furthermore, at the time of the external charge when charging connector 270 is connected to a charging facility (not shown) external to the vehicle represented by a charging station through a feeder cable 280, power storage device 216 is charged by receiving electric power from charger 224, which converts external electric power from the charging facility to the charging power of power storage device 216. It is to be noted that the "charging station" will be illustrated below as a typical example of a charging facility capable of externally charging hybrid vehicle 100.

As power storage device 216, a large-capacitance capacitor can also be employed, and any device may be employed as long as it is an electric power buffer that can temporarily store the generated electric power by motor generators 206, 210 and the electric power from the external electric power source, and can supply the stored electric power to motor generators 206 and 210. An output voltage VB and an input/output current IB of power storage device 216 are detected by sensors not shown, and detected values thereof are sent out to ECU 250.

Electric power converter 218 converts the electric power generated by motor generator 206 to DC power based on a signal PWM1 from ECU 250 for output to power storage device 216. Electric power converter 220 converts DC power supplied from power storage device 216 to AC power based on a signal PWM2 from ECU 250 for output to motor generator 210. When engine 202 is started, electric power converter 218 converts DC power supplied from power storage device 216 to AC power based on signal PWM1 for output to motor generator 206. Moreover, during braking of the vehicle or when acceleration is reduced on a down slope, electric power converter 220 converts electric power generated by motor generator 210 to DC power based on signal PWM2 for output to power storage device 216.

Motor generators 206 and 210 are AC motors, and are each made of, for example, a three-phase AC synchronous motor in which a permanent magnet is buried in a rotor. Motor generator 206 converts kinetic energy created by engine 202 to electric energy for output to electric power converter 218. Moreover, motor generator 206 creates driving force by three-phase AC power received from electric power converter 218 to start engine 202.

Motor generator 210 creates driving torque of the vehicle by three-phase AC power received from electric power converter 220. Moreover, during braking of the vehicle or when acceleration is reduced on a down slope, motor generator 210 converts dynamical energy stored in the vehicle as kinetic energy and potential energy to electric energy for output to electric power converter 220.

Engine 202 converts thermal energy by combustion of a fuel to kinetic energy of moving elements such as a piston, a rotor and the like, and outputs the converted kinetic energy to power split mechanism 204. For example, if the moving element is a piston, and the motion is a reciprocating motion, the reciprocating motion is converted to rotary motion through a so-called crank mechanism, and the kinetic energy of the piston is transmitted to power split mechanism 204. As a fuel of engine 202, a hydrocarbon-based fuel such as gasoline, light oil, ethanol, liquid hydrogen, and natural gas, or a liquid or gas hydrogen fuel is preferable.

Fuel tank 222 stores the fuel supplied through fuel supply port 260, and supplies the stored fuel to engine 202. A fuel remaining quantity FL inside fuel tank 222 is detected by a sensor not shown, and the detected value is output to ECU 250.

Charger 224 converts electric power from the external electric power source provided to charging connector 270 to the charging power of power storage device 216 based on a signal PWM3 from ECU 250 for output to power storage device 216.

ECU 250 executes arithmetic operations based on signals received from the respective sensors as well as a map and a program stored in a ROM (Read Only Memory) 252, to control equipment so as to bring hybrid vehicle 100 into a desired driving state. Alternatively, at least part of ECU 250 may be configured to execute predetermined mathematical/arithmetic operations by hardware such as an electric circuit.

More specifically, ECU 250 generates signals PWM1 and PWM2 for driving electric power converters 218 and 220, and outputs generated signals PWM1 and PWM2 to electric power converters 218 and 220, respectively. Moreover, upon receiving a signal REQ requesting the charge of power storage device 216 by charger 224, ECU 250 generates signal PWM3 for driving charger 224, and outputs generated signal PWM3 to charger 224.

The configuration for the external charge of hybrid vehicle 100 is not limited to the example in FIG. 1, but any configuration can be applied as long as it can convert the electric power from the charging facility (not shown) to the charging power of power storage device 216 during parking. For example, a configuration may be such that provision of charger 224 exclusive to the external charge is omitted, and the electric power from the external electric power source provided to charging connector 270 is converted to the charging power of power storage device 216 by electric power converters 218 and 220.

Furthermore, ECU 250 controls a traveling mode of hybrid vehicle 100. That is, ECU 250 controls the switching between EV traveling (electric traveling mode) using motor generator 210 alone with engine 202 stopped and hybrid traveling (hybrid traveling mode) with engine 202 operated. Hereinafter, the electric traveling mode is also referred to as "EV mode", and the hybrid traveling mode is also referred to as "HV mode."

Moreover, ECU 250 can also generate and manage information on the traveling using the electric power and information on fuel efficiency, based on fuel remaining quantity FL of fuel tank 222 and the respective detected values of voltage VB and current IB of power storage device 216, and alternatively, further based on another type of information not shown, and can display the information on a display not shown or the like. ECU 250 and navigation system 300 exchange the SOC (State of Charge) of power storage device 216, a signal INS (EV) instructing preferential selection of the EV traveling, and the like, as will be described later.

Figure 2:
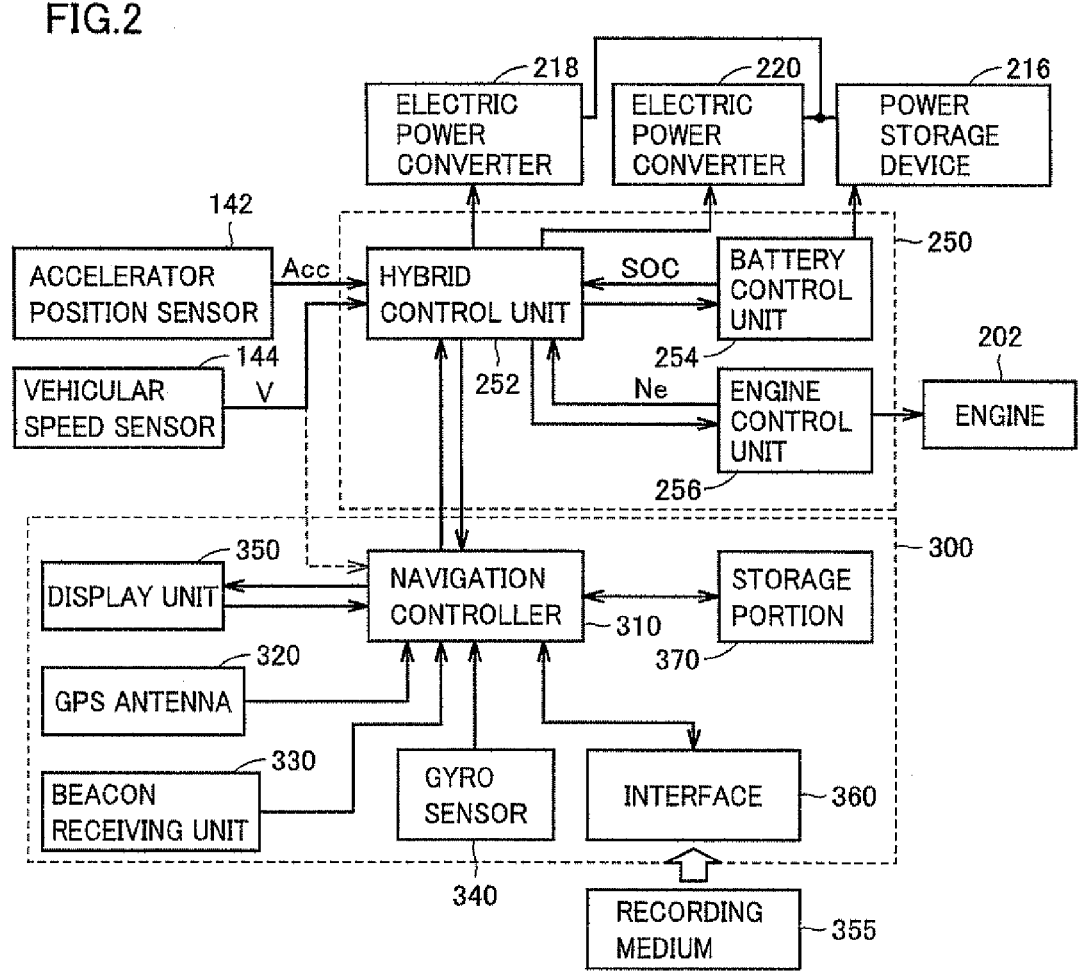
FIG. 2 is a block diagram illustrating a vehicle control configuration in relation to a navigation system shown in FIG. 1.

FIG. 2 is a block diagram illustrating a vehicle control configuration in relation to the navigation system shown in FIG. 1.

Referring to FIG. 2, ECU 250 includes a hybrid control unit 252, a battery control unit 254, and an engine control unit 256. Each of hybrid control unit 252, battery control unit 254, and engine control unit 256 may be implemented by configuring a circuit (hardware) having functions that correspond to the blocks in ECU 250, or may be implemented by ECU 250 executing software operations in accordance with a predetermined program.

Battery control unit 254 acquires the SOC indicating a state of charge of power storage device 216 such as by integrating charge/discharge currents of power storage device 216 for transmission to hybrid control unit 252. Alternatively, the SOC may be acquired with the output voltage and temperature of power storage device 216 further reflected therein.

Engine control unit 256 performs a throttle control of engine 202, and further, detects an engine speed Ne of engine 202 for transmission to hybrid control unit 252.

Hybrid control unit 252 calculates an output requested by a driver (requested power) based on an output signal Acc from an accelerator position sensor 142 and a vehicular speed V detected by a vehicular speed sensor 144. Hybrid control unit 252 calculates a required driving force (total power) in consideration of the state of charge SOC of power storage device 216 in addition to this driver's requested power, and further, calculates a speed requested of the engine and power requested of the engine. In other words, output power sharing between engine 202 and motor generator 210 with respect to the total power is determined.

Hybrid control unit 252 transmits the requested speed and the requested power to engine control unit 256 to cause engine control unit 256 to perform the throttle control for engine 202. In the EV mode, hybrid control unit 252 instructs engine control unit 256 to stop engine 202.

Further, hybrid control unit 252 generates control instructions (signals PWM1 and PWM2 shown in FIG. 1) for electric power converters 218 and 220 controlling motor generators 206 and 210, respectively, such that the output power from motor generator 210 conforms to the above-mentioned sharing.

Navigation system 300 includes a navigation controller 310, a GPS antenna 320, a beacon receiving unit 330, a gyro sensor 340, a display unit 350, an interface unit 360, and a storage portion 370.

Navigation controller 310 is typically implemented by an electronic control unit (ECU) similar to ECU 250 and offers route guidance of setting a traveling route to a destination. Typically, navigation controller 310 obtains information on a destination set by a user from display unit 350 including a touch display. It is to be noted that, throughout the present embodiment, any well-known method is applicable to the method of searching for a traveling route to the destination having been set once, which will not be described in detail.

Navigation controller 310 reads road map information (data) recorded on a recording medium 355 such as a CD (Compact Disk), DVD (Digital Versatile Disk) and the like through interface unit 360. It is to be noted that the road map data preferably contains information on charging facilities (charging stations) for externally charging hybrid vehicle 100, for example, information indicating their positions and charging capabilities (particularly, charging speeds). Storage portion 370 is an HDD (Hard Disk Drive), for example, and can store the road map data in a nonvolatile manner. It is to be noted that storage portion 370 may not be provided.

Navigation controller 310 receives external information from beacons installed on the road having been received by beacon receiving unit 330. For example, the external information from beacons allows acquisition of traffic congestion information, required time, construction information, speed/lane regulation information, information on parking lots and vacant space, and the like, and also allows identification of approach to a road pricing area. Alternatively, information indicating road pricing areas may be previously stored in the above-mentioned road map data.

That is, a functional portion of navigation controller 310 of reading road map information (data) from recording medium 355 or storage portion 370 and beacon receiving unit 330 constitute "an information acquisition unit."

Navigation controller 310 grasps vehicle position information, that is, a current position and a traveling direction of the vehicle using GPS antenna 320 and gyro sensor 340, or alternatively further using output V from vehicular speed sensor 144. That is, GPS antenna 320, gyro sensor 340 and vehicular speed sensor 144 or some of these units constitute "a vehicle position sensing unit."

Navigation controller 310 then displays the grasped vehicle position on display unit 350 in a manner overlapping the road map data. Further, when a destination is set by the user, navigation controller 310 searches for a traveling route from the current position to the destination, and offers route guidance on display unit 350. As is well known, audio guidance may be offered as part of the route guidance, based on the relation between the vehicle position and the retrieved traveling route.

Navigation controller 310 outputs signal INS (EV) to hybrid control unit 252 instructing a preferential selection of the EV mode while hybrid vehicle 100 is passing through a road pricing area. Upon receipt of signal INS (EV), hybrid control unit 252 selects the EV mode unless the SOC of power storage device 216 reaches a manageable lower limit.

Figure 3:
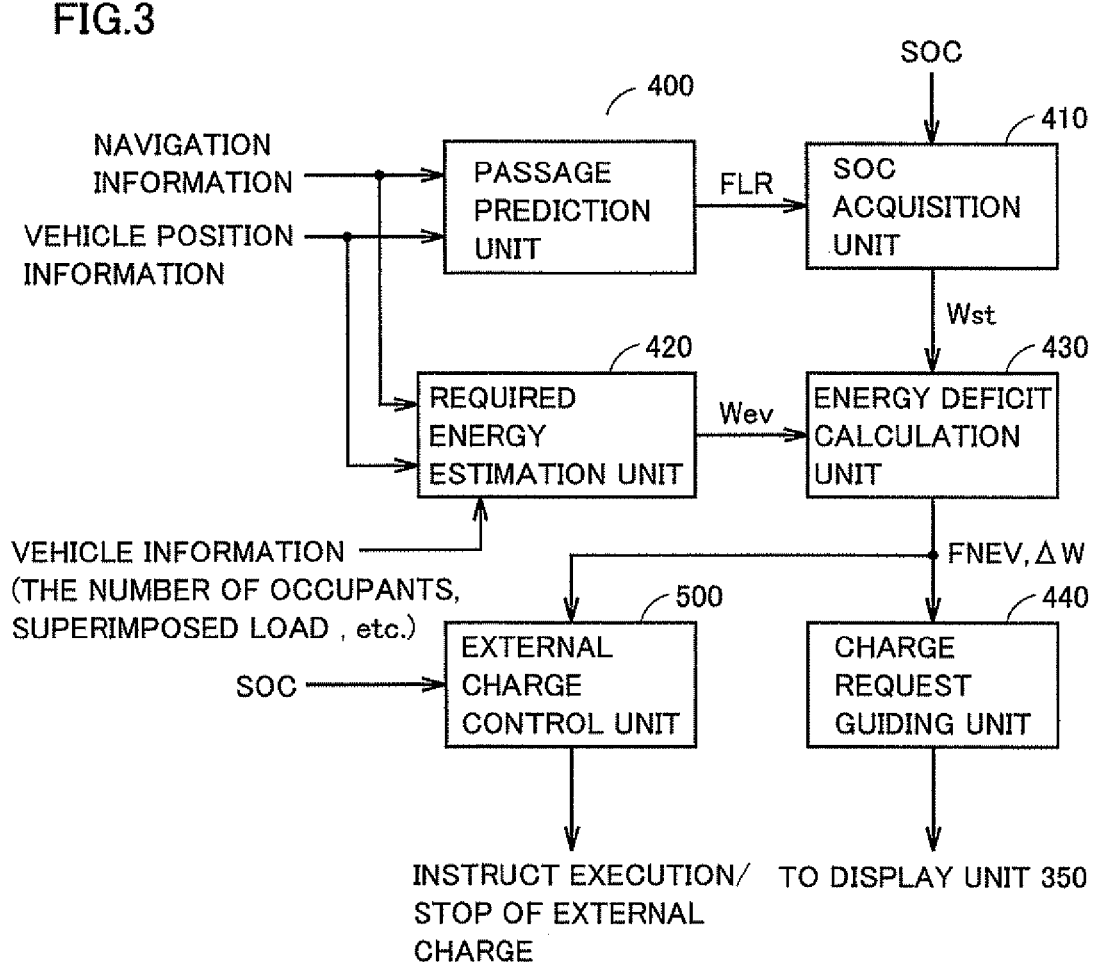
FIG. 3 is a functional block diagram illustrating a control configuration of the hybrid vehicle according to the embodiment of the present invention for preparation for passage through a road pricing area.

FIG. 3 is a functional block diagram illustrating a control configuration of the hybrid vehicle according to the embodiment of the present invention for preparing for passage through a road pricing area. Each functional block in FIG. 3 is typically implemented by a software operation achieved by navigation controller 310 or ECU 250 (FIG. 1) executing a predetermined program, but may be implemented by configuring the ECU to include a circuit (hardware) having the function corresponding to the block.

With reference to FIG. 3, a passage/nonpassage prediction unit 400 predicts in advance whether hybrid vehicle 100 will pass through a road pricing area where an exhaust gas emission vehicle is subjected to billing, that is, a zero emission vehicle is not subjected to billing, based on various types of navigation information including rod map data and external information from beacons as well as vehicle position information. When passage through a road pricing area is predicted, and when the hybrid vehicle approaches the road pricing area within a predetermined distance thereof, an approach flag FLR is turned "on".

For example, when searching for a route to a destination set by the user including a driver has been executed, passage/nonpassage prediction unit 400 can predict whether or not the vehicle will pass through a road pricing area based on whether a retrieved traveling route includes the road pricing area. In this case, when the distance to the border of the road pricing area is shorter than a predetermined distance based on the vehicle position and traveling direction grasped by GPS antenna 320 and the like, approach flag FLR may be turned on.

Even when a destination has not been set, whether the vehicle will pass through the road pricing area can be predicted based on the vehicle position and traveling direction grasped by GPS antenna 320 and the like, preferably further reflecting past traveling histories. When the distance to the border of the road pricing area is shorter than a predetermined distance, approach flag FLR can then be turned on.

When approach flag FLR is turned on, SOC acquisition unit 410 acquires the SOC indicating the state of charge of power storage device 216 from hybrid control unit 252, and calculates a stored energy quantity Wst available for the EV traveling based on the acquired SOC.

In response to the turning on of approach flag FLR, required energy estimation unit 420 estimates an energy quantity required for passing through the road pricing area by EV traveling, based on the navigation information. More specifically, required energy estimation unit 420 estimates a route passing through the road pricing area, and also calculates a required energy quantity Wev for passing through the road pricing area by EV traveling based on the distance of the predicted route, required time, and route information (gradient, etc.) Required energy quantity Wev may be calculated with vehicle information, such as the number of occupants and the superimposed load of hybrid vehicle 100, further reflected therein.

Energy deficit calculation unit 430 determines whether or not the vehicle can pass through the road pricing area by EV traveling with the current stored energy of power storage device 216 in accordance with stored energy quantity Wst based on the state of charge of power storage device 216 and required energy quantity Wev calculated by required energy estimation unit 420. When Wev>Wst holds, flag FNEV indicating that the vehicle cannot pass through the road pricing area by EV traveling is turned on, and otherwise flag FNEV is turned off.

When flag FNEV is on, energy deficit calculation unit 430 calculates an energy quantity $\Delta W$ deficient for passing through the road pricing area by EV traveling (hereinafter also referred to as an energy deficit $\Delta W$). A general expression is $\Delta W = Wev - Wst$.

When flag FNEV is turned on and energy deficit $\Delta W$ is calculated, charge request guiding unit 440 offers guidance for requesting an occupant (user) of hybrid vehicle 100 to have power storage device 216 externally charged. This guidance may be offered as a message displayed on display unit 350 of navigation system 300 or as an audio message from a speaker not shown, in accordance with an instruction from ECU 250 to navigation controller 310. In short, guidance can be offered in any manner that is recognizable to the user.

As described, offering guidance for requesting that a vehicle condition, specifically, the state of charge of power storage device 216, suitable for hybrid vehicle 100 to pass through the road pricing area by EV traveling be achieved enables control for suitable vehicle preparation for passage through the road pricing area. At this time, energy deficit $\Delta W$ (or may be its SOC equivalent (%)) is preferably presented to the user to aid him/her to determine whether to bypass the road pricing area.

Further, in combination with information (charging capability) on an adjacent charging facility (charging station) acquired by navigation system 300, a required time for externally charging energy deficit $\Delta W$ at the charging station is preferably informed. This can offer the user more detailed information that will serve as a basis for determining whether or not to execute external charge before passing through the road pricing area. User convenience can thus be improved.

External charge control unit 500 controls a charging operation of the power storage device in hybrid vehicle 100 at the time of external charge when an external electric power source is connected to charging connector 270. At the time of external charge, external charge control unit 500 instructs execution/stop of external charge in accordance with the SOC and a charge target level of power storage device 216.

When flag FNEV is turned on and energy deficit ΔW is calculated, external charge control unit 500 sets the charge target level in external charge at a value different from that under usual conditions in order to efficiently execute the vehicle preparation for passage through the road pricing area, as will be described later. Charge request guiding unit 440 and external charge control unit 500 shown in FIG. 4 thus constitute "a control unit."

Figure 4:
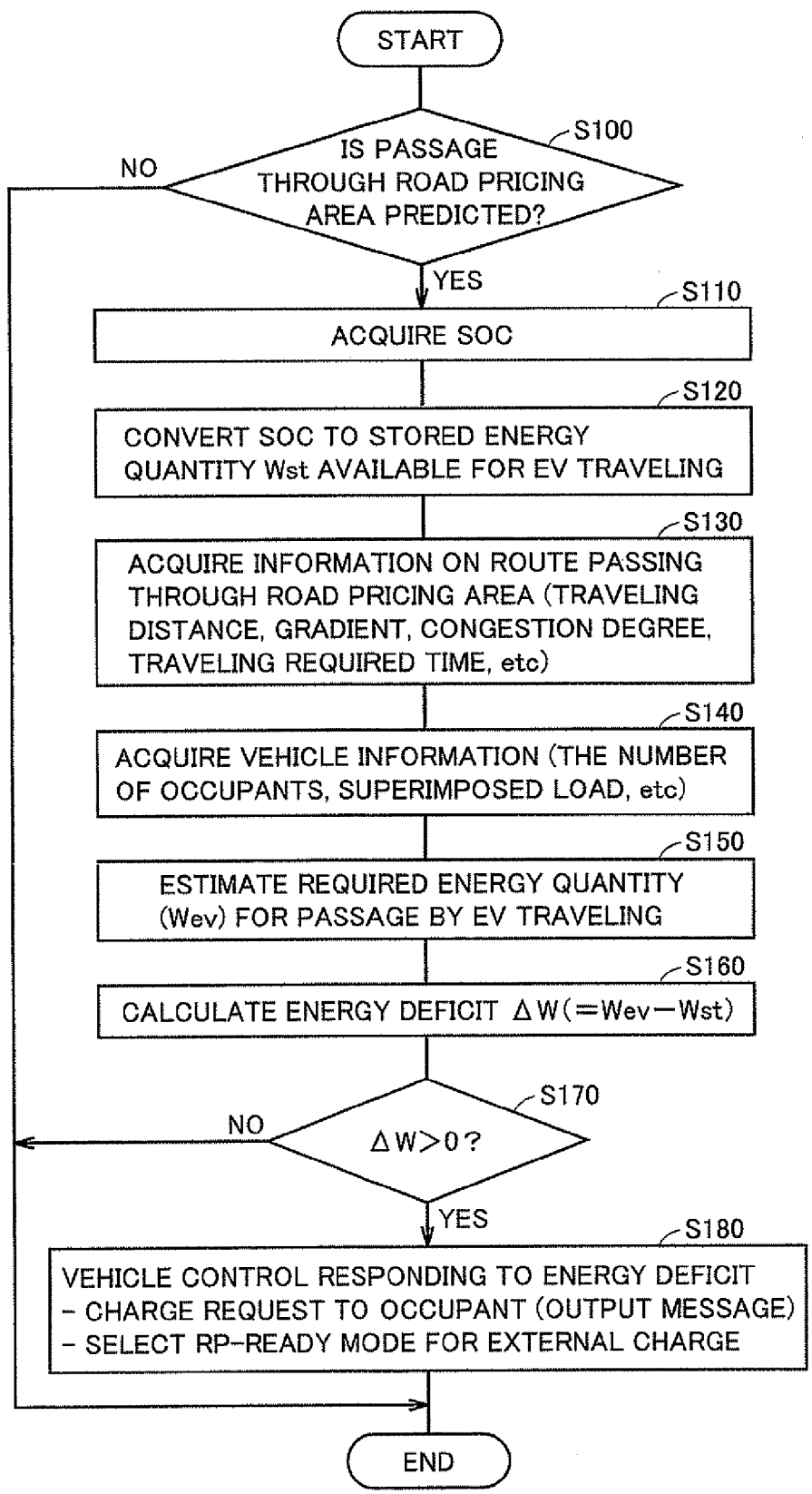
FIG. 4 is a first flow chart showing a control procedure in accordance with the functional block diagram shown in FIG. 3.

FIG. 4 is a first flow chart showing a control procedure in accordance with the functional block diagram shown in FIG. 3. It is to be noted that description will be made assuming that a cooperative overall control is executed in FIG. 4 that includes transmission and reception of information between ECU 250 (particularly, hybrid control unit 252) and navigation system 300 (particularly, navigation controller 310). However, it is noted, for confirmation, that the control procedure to be described below can be implemented by a single ECU. A program in accordance with the flow chart shown in FIG. 4 is executed in predetermined cycles during vehicle traveling.

With reference to FIG. 4, at step S100, navigation controller 310 predicts whether or not hybrid vehicle 100 will pass through a road pricing area where an exhaust gas emission vehicle is subjected to billing.

The determination at step S100 can be executed similarly to the determination executed by passage/nonpassage prediction unit 400 shown in FIG. 3. More specifically, a YES determination is made at step S100 by passage/nonpassage prediction unit 400 under the condition that approach flag FLR is turned on, and otherwise a NO determination is made at step S100.

When passage through the road pricing area is predicted (when the YES determination is made at step S100), ECU 250 acquires the current SOC of power storage device 216 at step S110. That is, the operation at step S110 corresponds to the function of SOC acquisition unit 410 shown in FIG. 3. Further, ECU 320 converts the SOC acquired at step S110 to stored energy quantity Wst available for EV traveling.

At step S130, navigation controller 310 acquires information on a route passing through the road pricing area. More specifically, a route for passing through the road pricing area from the current vehicle position is searched for, and in accordance with a retrieved result, a traveling distance, a route gradient, a congestion degree, and a traveling required time of the passing route are acquired. At step S140, navigation controller 310 acquires vehicle information of hybrid vehicle 100. The vehicle information includes, for example, the number of vehicle occupants and the superimposed load.

At step S150, navigation controller 310 estimates required energy quantity Wev for passing through the road pricing area by EV traveling, based on the information on the route for passing through the road pricing area (S130) and the vehicle information (S140). Steps S130 to S150 may be executed by ECU 250 based on the information received from navigation system 300.

At step S160, ECU 250 calculates energy deficit ΔW in accordance with stored energy quantity Wst available for EV traveling acquired at step S120 and required energy quantity Wev for passing through the road pricing area by EV traveling (generally, ΔW=Wev−Wst).

At step S170, ECU 250 determines whether energy deficit ΔW takes place. When ΔW>0 holds (when the YES determination is made at step S170), that is, when a determination is made that power storage device 216 needs to be charged in advance for traveling in the road pricing area by EV traveling, ECU 250 advances the process into step S180 to execute vehicle control for preparing a vehicle condition for passage through the road pricing area in correspondence with energy deficit ΔW.

For example, at step S180, in association with the function of charge request guiding unit 440 shown in FIG. 3, a message requesting the user to have power storage device 216 externally charged can be output, and guidance such as informing the user of a required time for charging energy deficit ΔW at an adjacent charging station can be offered. Alternatively, at step S180, a RP (Road Pricing)-ready mode is selected for external charge such that external charge specialized in vehicle preparation for passage through the road pricing area can be executed.

When the vehicle can pass through the road pricing area by EV traveling with the current stored energy of power storage device 216, that is, when ΔW≦0 holds (when the NO determination is made at step S170), step S180 is not executed.

Figure 5:
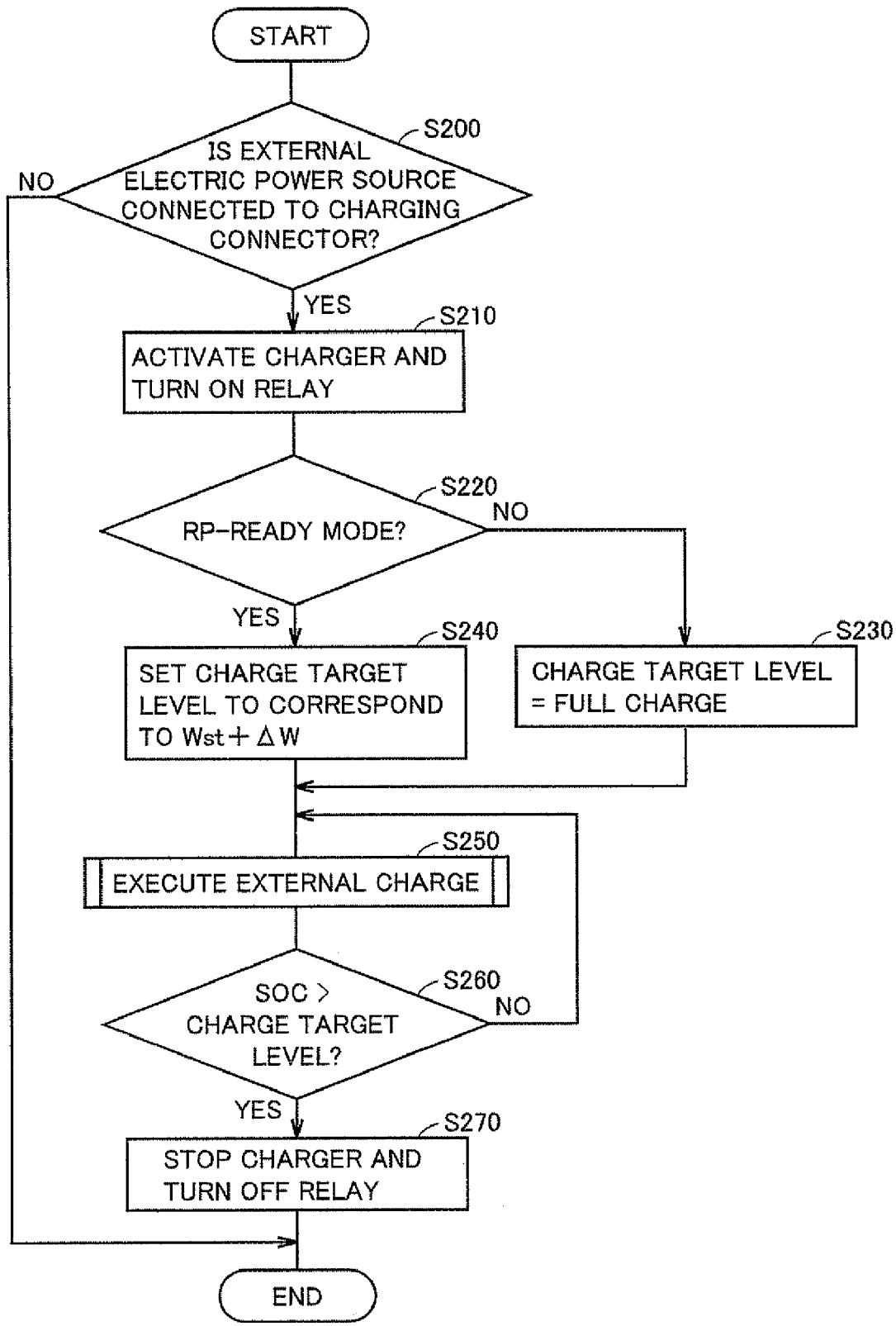
FIG. 5 is a second flow chart showing a control procedure in accordance with the functional block diagram shown in FIG. 3.

FIG. 5 is a second flow chart showing a control procedure in accordance with the functional block diagram shown in FIG. 3. More specifically, FIG. 5 shows a control procedure executed by external charge control unit 500. A program in accordance with the flow chart shown in FIG. 5 is executed, for example, in response to mounting of a feeder cable 280 during a vehicle stop.

With reference to FIG. 5, ECU 250 determines at step S200 whether or not an external electric power source is connected to charging connector 270. When the external electric power source is not connected (when the NO determination is made at step S200), steps S210 to S270, which will be described below, are not executed. In this case, feeder cable 280 may be connected inappropriately. Therefore, a control configuration is preferable in which an alarm is issued to the user and step S200 is executed again in response to operation of feeder cable 280 again.

When the external electric power source is connected to charging connector 270 so that an external charge mode is started (when the YES determination is made at step S200), ECU 250 advances the process into step S210, where charger 224 is activated, and a relay not shown is turned on to ensure a charging path over which power storage device 216 is charged by the external electric power source.

ECU 250 then advances the process into step S220 to check whether or not the RP-ready mode has been selected at step S180. Under usual conditions that the RP-ready mode has not been selected (when the NO determination is made at step S220), ECU 250 sets, at step S230, the charge target level in external charge to correspond to a full charge state.

In contrast, when the RP-ready mode has been selected (when the YES determination is made at step S220), ECU 250 sets, at step S240, the charge target level in external charge to correspond to Wst+ΔW. In other words, the charge target level in external charge is set at a minimum charging level for passing through the road pricing area by EV traveling.

ECU 250 then advances the process into step S250 to execute external charge in accordance with the charge target level set at step S230 or S240. More specifically, electric power from the external electric power source is converted by charger 224 to a current for charging power storage device 216, so that charge is executed.

At step S260, ECU 250 determines whether or not the SOC of power storage device 216 reaches the charge target level. Until the SOC reaches the charge target level (when the NO determination is made at step S260), external charge (S250) is continuously executed. When the SOC reaches the charge target level (when the YES determination is made at step S260), ECU 250 senses the completion of charging of power storage device 216, and terminates external charge. In other words, at step S270, charger 224 is stopped, and the relay turned on at step S210 is turned off.

Therefore, when the RP-ready mode is selected, external charge can be limited to the minimum charging level for passing through the road pricing area by EV traveling, which can shorten the charge required time. It is to be noted that the vehicle may be configured to allow for selection of external charge to reach the full charge state based on a vehicle user's request. However, the present embodiment is characterized in that, in the RP-ready mode, the charge target level in external charge is limited to a minimum corresponding to energy deficit ΔW without any particular user's request.

As described, according to the hybrid vehicle of the embodiment of the present invention, offering guidance on external charge of power storage device 216 before passing through the road pricing area based on calculation of energy deficit ΔW as well as setting the charge target level at the time of the external charge enable suitable preparation of a vehicle condition (the state of charge of the power storage device) for passage through the road pricing area by EV traveling.

It should be construed that embodiment disclosed herein is by way of illustration in all respects, not by way of limitation. It is intended that the scope of the present invention is defined by claims, not by the description above, and includes all modifications equivalent in meaning and scope to the claims.

The invention claimed is:

1. A hybrid vehicle comprising:
an internal combustion engine;
a power storage device configured to be rechargeable by a charging facility external to said hybrid vehicle;
a motor outputting a vehicle driving force using electric power from said power storage device;
a vehicle position sensing unit acquiring vehicle position information of said hybrid vehicle;
an information acquisition unit acquiring at least one of road map information and external information from outside said hybrid vehicle;
a passage prediction unit for predicting in advance whether said hybrid vehicle will pass through a certain regulated area where vehicle traveling using said internal combustion engine is subjected to billing, based on said vehicle position information as well as on said at least one of said road map information and said external information;
an acquisition unit acquiring a current state of charge of said power storage device when passage through said regulated area is predicted;
a required energy estimation unit estimating a required energy quantity required to be output from said power storage device for passing through said regulated area in an electric traveling mode of traveling using the vehicle driving force from said motor with said internal combustion engine stopped, when passage through said regulated area is predicted;
an energy deficit calculation unit calculating an energy deficit of said power storage device deficient for said hybrid vehicle to pass through said regulated area in said electric traveling mode, based on an estimated value of said required energy quantity estimated by said required energy estimation unit and the current state of charge of said power storage device; and
a control unit for executing control for preparing for passage through said regulated area based on the energy deficit calculated by said energy deficit calculation unit, before entering said regulated area, wherein said control unit includes an external charge control unit controlling charging in accordance with a state of charge and a charge target level of said power storage device during external charge of said power storage device by said charging facility, and
when said energy deficit is calculated by said energy deficit calculation unit, said external charge control unit sets said charge target level such that an energy quantity charged by said external charge corresponds to said energy deficit.

2. The hybrid vehicle according to claim 1, wherein said control unit includes a guiding unit for requesting a user of said hybrid vehicle to have said power storage device charged, when said energy deficit is calculated by said energy deficit calculation unit.

3. The hybrid vehicle according to claim 2, wherein said guiding unit is further configured to inform said user of a required time for charging said energy deficit by said charging facility adjacent to a current position of said hybrid vehicle, based on said at least one of said road map information and said external information as well as on said energy deficit.

4. A method of controlling a hybrid vehicle equipped with an internal combustion engine, a power storage device configured to be rechargeable by a charging facility external to said hybrid vehicle, a motor outputting a vehicle driving force using electric power from said power storage device, and a navigation system configured to acquire vehicle position information of said hybrid vehicle and at least one of road map information and external information from outside said hybrid vehicle, said method comprising the steps of:
predicting in advance whether said hybrid vehicle will pass through a certain regulated area where vehicle traveling using said internal combustion engine is subjected to billing, based on said vehicle position information as well as on said at least one of said road map information and said external information;
acquiring a current state of charge of said power storage device when passage through said regulated area is predicted;
estimating a required energy quantity required to be output from said power storage device for passing through said regulated area in an electric traveling mode of traveling using the vehicle driving force from said motor with said internal combustion engine stopped, when passage through said regulated area is predicted;
calculating an energy deficit of said power storage device deficient for said hybrid vehicle to pass through said regulated area in said electric traveling mode, based on an estimated value of said required energy quantity estimated by said step of estimating and the current state of charge of said power storage device; and
executing control for preparing for passage through said regulated area based on the energy deficit calculated by said step of calculating, before entering said regulated area; and
setting a charge target level in external charge of said power storage device by said charging facility such that an energy quantity charged by said external charge corresponds to said energy deficit, when said energy deficit is calculated by said step of calculating.

5. The method of controlling a hybrid vehicle according to claim 4, wherein said step of executing control offers guidance for requesting a user of said hybrid vehicle to have said power storage device charged, when said energy deficit is calculated by said step of calculating.

6. The hybrid vehicle according to claim 5, wherein said step of executing control further informs said user of a required time for charging said energy deficit by said charging facility adjacent to a current position of said hybrid vehicle, based on said at least one of said road map information and said external information as well as on said energy deficit.

7. The hybrid vehicle according to claim 1, wherein said external charge control unit is configured to be capable of setting said charge target level at a full charge level based on a request from a user of said hybrid vehicle, even when said energy deficit is calculated by said energy deficit calculation unit.

8. The method of controlling a hybrid vehicle according to claim 4, wherein said step of setting is capable of setting said charge target level at a full charge level based on a request from a user of said hybrid vehicle, even when said energy deficit is calculated by said step of calculating.

9. The hybrid vehicle according to claim 2, wherein said external charge control unit is configured to be capable of setting said charge target level at a full charge level based on a request from a user of said hybrid vehicle, even when said energy deficit is calculated by said energy deficit calculation unit.

10. The hybrid vehicle according to claim 3, wherein said external charge control unit is configured to be capable of setting said charge target level at a full charge level based on a request from a user of said hybrid vehicle, even when said energy deficit is calculated by said energy deficit calculation unit.

11. The method of controlling a hybrid vehicle according to claim 5, wherein said step of setting is capable of setting said charge target level at a full charge level based on a request from a user of said hybrid vehicle, even when said energy deficit is calculated by said step of calculating.

12. The method of controlling a hybrid vehicle according to claim 6, wherein said step of setting is capable of setting said charge target level at a full charge level based on a request from a user of said hybrid vehicle, even when said energy deficit is calculated by said step of calculating.

\* \* \* \* \*